No. 698,659.  
Patented Apr. 29, 1902.

T. DUNCAN.  
MOTOR METER.  
(Application filed Sept. 23, 1899. Renewed Jan. 6, 1902.)

(No Model.)

Witnesses  
Samuel R. Bachtel  
Max Gabel

Inventor  
Thomas Duncan  
By his Attorneys  
Charles A. Brown & Cragg

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

MOTOR-METER.

SPECIFICATION forming part of Letters Patent No. 698,659, dated April 29, 1902.

Application filed September 23, 1899. Renewed January 6, 1902. Serial No. 88,483. (No model.)

*To all whom it may concern:*

Be it known that I, THOMAS DUNCAN, a citizen of the United States, residing at Chicago, in the county of Cook and State of Illinois, have invented a certain new and useful Improvement in Motor-Meters, (Case No. 4,) of which the following is a full, clear, concise, and exact description, reference being had to the accompanying drawings, forming a part of this specification.

My invention relates to motor-meters for measuring the real energy in circuits containing self-induction where for any cause the currents lag behind the impressed electromotive force. In induction-meters of this class it is requisite that the magnetic field, which represents the electromotive force, be in quadrature with the line-pressure—that is, must lag a quarter-period behind the said impressed electromotive force of the circuit. My present invention accomplishes this result by a disposition and connection of the two shunt field-coils in parallel with each other and adjustable means for varying the phase of one of these coils, so that the resultant magnetism of the two coils will have the necessary lag of ninety degrees behind the electromotive force of the circuit.

I will explain my invention more particularly by reference to the accompanying drawings, in which—

Figure 1:
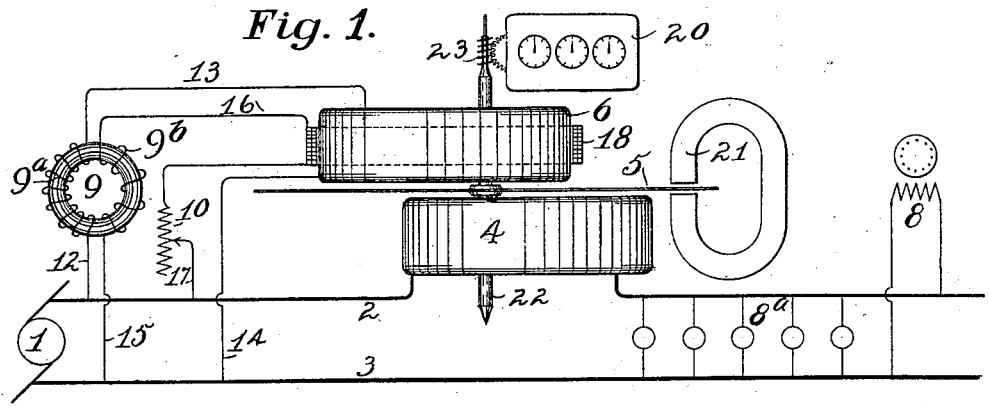
Figure 2:
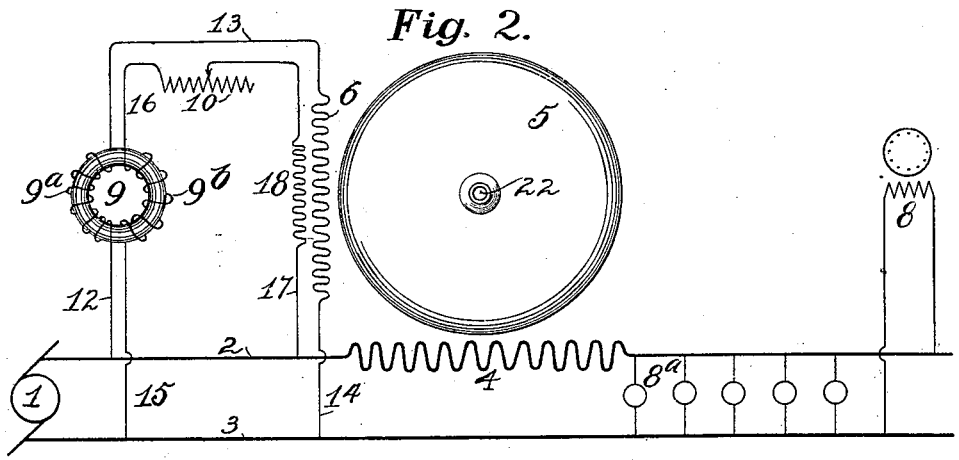
Figure 3:
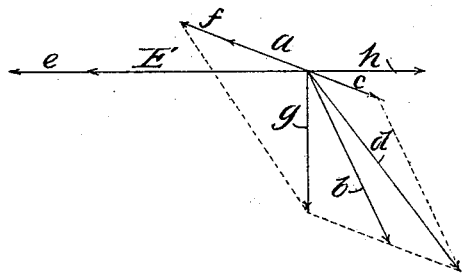

Figure 1 shows the meter of my invention and the circuits connected therewith partly in diagram. Fig. 2 is another diagrammatic view of the circuit arrangements of my invention. Fig. 3 is a vector diagram representing the currents in the circuits of the meter and their relations.

Similar characters of reference indicate similar parts in Figs. 1 and 2.

The alternating-current generator 1 is connected by lines 2 3 to the inductive and non-inductive loads 8 $8^a$. The current-coil 4 is connected in circuit in the usual way and is inductively associated with the rotating disk 5, mounted upon the spindle 22 and connected with the registering-train 20 by the worm-gear 23 in a well-known way. The permanent magnet 21 is associated with the disk 5 for the purpose of acting as a retarding device in a manner well known to those skilled in the art. The pressure-coils 6 and 18 are connected in shunt across the circuits 2 3 and are preferably arranged as concentric coils with their axis parallel to the axis of the coil 4, but not concentric therewith.

One of the two shunt-coils, as 6, I construct of a relatively high number of turns, and I include in the circuit with this coil the winding $9^a$ of the impedance-coil 9, which has a core of laminated iron. The other coil 18 has a comparatively small number of turns and is connected with the winding $9^b$ of the impedance-coil 9. The circuit 15 $9^b$ 16 18 10 17 will contain less reactance than the circuit 12 $9^a$ 13 6 14, due to its greater number of turns $9^a$ and 6 and due also to the resistance 10, which is connected in series with the shunt-coil 18.

The resistance 10 I make adjustable for the purpose which I will hereinafter explain.

From the foregoing it results that an impulse of current from the circuit 2 3 will traverse the circuit 15 $9^b$ 16 18 10 17 before it traverses the circuit 12 $9^a$ 13 6 14. The current in this latter circuit is directed through the coil 6 in a direction opposite to the currents in the circuit including coil 18. This is accomplished by having its terminals 12 and 14 connected to the leads 2 and 3 in a reversed manner. The joint magnetism of the concentric coils 6 and 18, therefore, is the resultant of the opposite effects of coils 6 and 18 with their own self-induction, due to the impedance of the circuits in which they are connected and plus the additional influence mutually exercised upon these circuits by the impedance-coils $9^a$ and $9^b$. I will analyze the actions of the currents traversing these circuits by reference to the vector diagram of Fig. 3, in which the line electromotive force is represented by the line E. The impulse of current traversing circuit 15 $9^b$ 16 18 10 17, which is slightly in advance of that through circuit 12 $9^a$ 13 6 14, is represented by line $a$ as lagging about twenty degrees behind the line electromotive force. This line $a$ also represents the magnetic field set up by the current traversing the coil 18, the current and the magnetism being in phase. The impulse of current traversing the circuit 12 9ª 13 6 14 occurs an instant later, and which, due to the reversed connection of this circuit is in the opposite direction to that in coil 18, is represented by the line $b$. This current lags, say, fifty or sixty degrees behind the line electromotive force E; but since it receives the current from the leads 2 3 in the opposite direction to the other circuit the phase relation between this current and that of the other circuit will be represented by one hundred and eighty degrees plus the excess in lag of current in circuit including coil 6 over that of the circuit including coil 18. This will be represented by line $b$, as stated. The two circuits including the coils 6 and 18 will have mutual influence upon each other by their windings 9ª and 9ᵇ upon the impedance-coil 9. The coil 9ᵇ will induce in the coil 9ª a secondary electromotive force, (represented by line $h$ in Fig. 3.) This will have a resulting lagging current, (represented by line $c$,) so that the actual current in the coil 9ª will be the resultant of $b$, due to the primary electromotive force, and $c$, due to the secondary electromotive force. This resultant is represented by line $d$ of Fig. 3. Furthermore, the coil 9ª will in its turn induce a secondary electromotive force, (represented by the line $e$ in the coil 9ᵇ,) and this secondary electromotive force will have a secondary current lagging in phase, (represented by line $f$.) Hence a current and magnetism through the pressure-coil 18 will be represented by the lines $a\,f$ and a current and magnetism through the coil 6 by the line $d$. Combining these or completing the parallelogram of forces we obtain the resultant line $g$ at right angles to the line-pressure—that is, $g$ is the magnetic field representing by its magnitude the impressed electromotive force of the circuit and is the resultant of the line $a\,f$ and the resultant line $d$. It will be obvious that the line $c$, which, combined with $b$, produces the resultant $d$, which in its turn determines the position of line $g$, is subject to adjustment by means of the adjustable resistance 10, which adjustably modifies the phase of the current in the circuit including coil 18, and the line $g$, therefore, representing the resultant magnetism of the shunt or pressure coils, may be adjusted to the required quadrature with the impressed electromotive force of the circuit.

I have shown in Fig. 1 a disk as the rotatable element of the meter. It will be apparent that my invention may be carried out with other forms of armatures, and in general I do not wish to be limited to the specific arrangements and devices shown, as they are capable of various modifications without departing from the spirit of my invention; but, Having described my invention, what I claim as new, and desire to secure by Letters Patent, is—

1. In an induction motor-meter the combination with an armature of the current-winding in inductive relation therewith, a pressure-winding of relatively high self-induction also in inductive relation with said armature, a second pressure-winding associated with said first pressure-winding but having relatively small self-induction, the connections of the said two pressure-windings with the circuit being reversed, an impedance-coil having two windings, one of relatively large number of turns connected in series with said first pressure-coil, and the other of a less number of turns connected in circuit with said second pressure-coil and an adjustable resistance also in circuit with said second pressure-coil, substantially as and for the purpose specified.

2. In an induction motor-meter, the combination with the armature, of a current-winding in inductive relation therewith, two pressure-windings having reversed connections also in inductive relation with said armature, and an impedance-coil having two windings each included in circuit with one of said pressure-windings independently of the other, whereby the magnetism representing the electromotive force may be maintained in quadrature with the electromotive force, substantially as described.

3. In a device of the class described, the combination with an armature of a current-winding in inductive relation therewith, a pressure-winding having large self-induction also in inductive relation with said armature, a second pressure-winding having relatively small self-induction, said pressure-windings having their connections reversed, and an impedance-coil having two windings each included in circuit with one of said pressure-windings independently of the other, whereby the magnetism representing the electromotive force may be maintained in quadrature with the electromotive force, substantially as described.

4. In an induction motor-meter, the combination with an armature of the current-winding in inductive relation therewith, a pressure-winding also in inductive relation with said armature, a second pressure-winding having small self-induction with relation to said first pressure-winding and having its connections reversed in direction to that of the first pressure-winding, an impedance-coil having windings each in circuit with a pressure-winding independently of the other, and an adjustable resistance in circuit with said second pressure-winding whereby the magnetism of the pressure-winding is maintained in quadrature with the electromotive force of the circuit including the series winding.

5. In an induction motor-meter the combination with an armature, of a current and two pressure windings in inductive relation therewith, an impedance-coil having interacting windings each included in circuit with a pressure-winding independently of the other and a means included in circuit with one of said pressure-windings, whereby the magnetism of the pressure-field may be maintained in quadrature with the electromotive force of the working circuit, substantially as described.

6. In a device of the class described, the combination with the revoluble armature 5 of the current-coil 4 in inductive relation therewith, pressure-coil 6 connected in shunt with the main circuit also in inductive relation therewith, a secondary pressure-coil 18 associated with said pressure-coil 6 and having its connections with the main circuit reversed with respect to those of the first pressure-coil, the impedance-coil 9 having the windings $9^a$ and $9^b$ connected in circuit respectively with the pressure-coils 6 and 18, the adjustable resistance 10 connected in circuit with said pressure-coil 18, the retarding-magnet 21 in coöperative relation with the armature, and the counting-train 20, adapted to be operated by said revoluble armature, substantially as and for the purpose set forth.

7. In an induction motor-meter, the combination with the armature of a current-winding in inductive relation therewith, two pressure-windings also in inductive relation therewith and two interacting impedance-windings receiving current independently of each other, each pressure-winding being operatively associated with an impedance-winding whereby the desired phase relation between the field due to said pressure-windings and the impressed electromotive force is secured, substantially as described.

8. In an induction motor-meter, the combination with the armature of a current-winding in inductive relation therewith, two pressure-windings having relatively large and small self-induction also in inductive relation therewith and two interacting impedance-windings receiving current independently of each other, each pressure-winding being operatively associated with an impedance-winding whereby the desired phase relation between the field due to said pressure-windings and the impressed electromotive force is secured, substantially as described.

9. In a motor, the combination with a current-winding, of two pressure-windings, and two interacting impedance-windings receiving current independently of each other each pressure-winding being operatively associated with an impedance-winding, whereby the desired phase relation between the field due to said pressure-windings and the impressed electromotive force is secured, substantially as described.

10. A motor having current and pressure field-windings, in combination with interacting impedance-windings receiving current independently of each other and operatively associated with the pressure field portion of the motor, whereby the desired phase relation between the pressure-field and the impressed electromotive force may be secured, substantially as described.

11. In an alternating-current motor-meter, the combination with a current field-winding, of two pressure field-windings and an impedance-coil having interacting windings, each included in circuit with a pressure-winding of the meter independently of the other, substantially as described.

In witness whereof I hereunto subscribe my name this 13th day of September, A. D. 1899.

THOMAS DUNCAN.

Witnesses:
CHARLES A. BROWN,
GEORGE L. CRAGG.